United States Patent Office 3,809,729
Patented May 7, 1974

3,809,729
FLAME RETARDANT THERMOPLASTIC
COMPOSITIONS
Donald L. Reinhard, Albany, N.Y., assignor to
General Electric Company
No Drawing. Filed June 10, 1971, Ser. No. 151,930
Int. Cl. C08f 29/12, 41/12, 45/56
U.S. Cl. 260—874                                    6 Claims

ABSTRACT OF THE DISCLOSURE

Self-extinguishing and non-dripping thermoplastic compositions for molding are provided comprising a normally flammable polyphenylene ether resin and styrene resin or an aromatic polycarbonate resin and a flame retardant combination of up to 6 parts of hexabromobenzene per 100 parts of resin and an antimony compound, the weight ratio of antimony to bromine being sufficient to prevent dripping during ignition and before self-extinguishment. Optionally, it is beneficial to include a minor amount of an aromatic phosphate compound.

---

This invention relates to flame retardant thermoplastic compositions. More particularly, it pertains to self-extinguishing and non-burning thermoplastic compositions for molding comprising either a normally flammable combination of a polyphenylene ether resin and a styrene resin or a normally flammable aromatic polycarbonate resin and a flame retardant amount of a combination of hexabromobenzene and an antimony compound.

BACKGROUND OF THE INVENTION

Polyphenylene ether resins comprise a class of engineering thermoplastics characterized by outstanding hydrolytic stability, excellent dielectric properties, broad temperature use range and dimensional stability at elevated temperatures. They are prepared, in general, by the oxidative coupling of a phenolic compound with a complex copper catalyst. See, for example, Hay, U.S. 3,306,874 and 3,306,875 for a description of the preparation and uses of polyphenylene ether resins.

Ease of processing on injection molding and extrusion equipment is enhanced when the polyphenylene ethers are combined with styrene resins, e.g., crystal homopolystyrene and rubber modified high impact polystyrenes, and compositions comprising from 10 to 60 parts of polyphenylene ether and 90 to 40 parts of styrene resin offer an especially wide range of desirable design properties. Such combinations are disclosed in Cizek, U.S. 3,383,435.

Because polyphenylene ethers are normally self-extinguishing and non-dripping, compositions containing this resin as substantially all of the thermoplastic component are flame-retardant. However, the addition of styrene resin, to form the compositions described by Cizek, leads to molding compounds and articles which are normally flammable, i.e., they have poor flame retardant properties and thus are unable to meet the requirements established by various testing groups such as Underwriters' Laboratories. Moreover, the composition drips flaming resin while burning, which is a serious shortcoming and is not permitted by tests more stringent than, for example, ASTM-D 635.

Aromatic polycarbonate resins form another class of engineering thermoplastics characterized by uncommonly high impact strengths over a wide range of use temperatures, high transparency, excellent dimensional stability and very little creep under load. They are prepared, in general, by condensation of a dihydric phenol or a derivative thereof, with a difunctional carbonate and comprise polymers of a carbonate of a dihydric phenol in which the carbonate group is attached directly to a carbon atom of an aromatic ring. See, for example, Fox, U.S. 3,144,432 and the Encyclopedia of Polymer Science and Technology, Interscience, vol. 11, p. 710–764 (1969) for a description of the preparation and uses of aromatic polycarbonate resins.

Although aromatic polycarbonates are generally considered to be inherently flame retardant—they are classified as self-extinguishing according to ASTM D-635—they meet only the moderately stringent requirements established by Underwriters' Laboratories for group 2(SE-2). Aromatic polycarbonates alone do not meet the more rigorous group 1(SE-1) requirements of Underwriters' Laboratories because they do not self-extinguish in a vertical position, with the flame burning upwardly. Furthermore, in any position, the burning aromatic polycarbonates drip flaming resin which can ignite combustible material below themselves.

Previous proposals to render polyphenylene ether-styrene or aromatic polycarbonate compositions flame retardant have involved adding classical flame retardant agents, such as halogenated organic compounds and phosphorus compounds, optionally combined with antimony compounds, and the like. No such approach thus far has been completely satisfactory because when sufficient flame retardant agent is added, physical properties deteriorate; the more efficient non-classical flame retardant agents are too expensive, and in all cases the dripping problem remains.

It has been proposed, for example, to render polyphenylene ether-styrene combinations flame retardant with combinations of highly chlorinated biphenyls and aromatic phosphates.

It has also been proposed to render aromatic polycarbonates flame retardant with chlorinated cycloaliphatics or with brominated aromatics, especially polybromiodiphenylcarbonate, which is expensive.

It has been proposed also to use hexabromobenzene and antimony oxide, in large amounts, to render polyester resin compositions self-extinguishing. These resins differ chemically from polyphenylene ethers and aromatic polycarbonates. In any event, the amount of bromine (7.6%) and antimony (4.2%) combined in one such composition had to be 11.8%, based on the polymer, before self-extinguishing time could be lowered to 1 second.

It has now been discovered that a combination of hexabromobenzene and an antimony compound, in proper amounts based on the resin, and in a particular ratio of antimony to bromine, can be used to render polyphenylene ether-styrene compositions and aromatic polycarbonate compositions, self-extinguishing and non-dripping, economically and without deteriorating mechanical or other properties.

In particular, it has unexpectedly been discovered that if the amount of bromine exceeds about 6% by weight based on the polymer, the material drips during ignition and before self-extinction and physical properties deteriorate. Furthermore, if the antimony compound is omitted, not only does the composition fail to self-extinguish—it drips while burning. In addition, regardless of the amount of bromine present, unless the weight ratio of antimony to bromine in the essential combination is at least about 0.25:1, the compositions will drip during ignition and before self-extinction.

In addition to discovery that the minimum amount of hexabromobenzene and antimony previously proposed for polyesters is much too high to prevent dripping in polyphenylene ether-styrene or aromatic polycarbonates, it has also been discovered that efficient flame retarding action can be achieved with only 2.8 parts of bromine and 1.33 parts of antimony per 100 parts of resin. Such low effective levels of flame retardant additives permit the highest ultimate physical properties to be retained.

DESCRIPTION OF THE INVENTION

According to this invention there are provided flame retardant, self-extinguishing and nondripping thermoplastic compositions for molding, e.g., injection molding, compression molding, transfer molding and extrusion, comprising (i) a normally flammable polymer composition comprising a polyphenylene ether resin and a styrene resin, or
(ii) a normally flammable aromatic polycarbonate, i.e., a polymer of a carbonate of a dihydric phenol in which the aromatic group is attached directly to a carbon atom of an aromatic ring, and a flame retardant amount of a composition comprising
   (a) hexabromobenzene and
   (b) an inorganic or organic antimony-containing compound, the amount of hexabromobenzene in the composition providing bromine not in excess of about 6.0 parts by weight per hundred parts of said polymer, and the weight ratio of antimony to bromine in said combination being at least sufficient to prevent dripping of the composition during ignition and before self-extinguishment.

When used herein, the term "normally flammable," describes a composition which does not meet the requirements of either ASTM test method D-635 or the more severe requirements of Underwriters' Laboratories Bulletin No. 94. The terms "self-extinguishing" and "nondripping" as used herein and in the appended claims define compositions which always meet the requirements of both ASTM test D-635 and the rigorous requirements of Underwriters' Laboratories Bulletin No. 94 and thus will be classed as group 1(SE-1) flame retardant compositions. ASTM test D-635 for flammability comprises contacting the end of a specimen ½" x 5" and "thickness normally supplied" with a Bunsen burner flame for 30 seconds; and repeating if there is no ignition. If the specimen does ignite but does not continue burning to the 4" mark, after the flame is removed, it is classed "self-extinguishing by this test," even if it drips while burning. In the more rigorous Underwriters' Laboratories Bulletin No. 94 test, a molded piece of about 2½" x ½" x ⅛" is formed from the composition and if it does not drip on ignition—sufficiently to ignite a piece of cotton 12 inches beneath—and will extinguish itself within 30 seconds, after two 10-second ignitions, the composition is deemed to be flame-retardant and non-dripping and it satisfies the requirements for group 1(SE-1) compositions.

The normally flammable polymer compositions comprising a polyphenylene ether resin and a styrene resin used in the present invention are available commercially or can be prepared by known techniques. For example, from about 10 to about 60 parts of a polyphenylene ether resin, prepared, e.g., by the procedure in U.S. 3,306,874 and 3,306,875, can be combined with from about 90 to 40 parts styrene resin, as described in U.S. 3,383,435 by, e.g., passing mixtures of the resins through a single-screw extruder at a temperature between 450° and 550° F. and cooling and chopping the extrudate into pellets.

It is preferred that the polyphenylene ether be one of a family represented by the formula

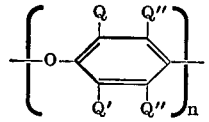

wherein Q is a hydrocarbon radical, a halohydrocarbon radical having at least two carbon atoms between the halogen atom and the phenol nucleus, a hydrocarbonoxy radical or a halohydrocarbonoxy radical having at least two carbon atoms between the halogen and the phenol nucleus; Q' is as defined for Q and in addition, halogen; Q" are each as defined for Q' and in addition, hydrogen, provided that Q, Q' and Q" are all free of a tertiary alpha-carbon atom; and $n$ is at least about 50. Herein, "hydrocarbon" and derivatives thereof, such as "halohydrocarbon," preferably contain up to about 12 carbon atoms and especially preferably up to about 8 carbon atoms.

The preferred styrene resins will be those having at least 25% by weight of repeating units derived from a vinyl aromatic compound of the formula

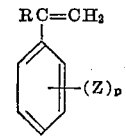

wherein R is hydrogen, (lower)alkyl or halogen; Z is vinyl, halogen or (lower)alkyl; and $p$ is 0 or an integer of from 1 to the number of replaceable hydrogen atoms on the benzene nucleus. Herein, the term "(lower)alkyl" means alkyl from 1 to 6 carbon atoms.

The term "styrene resins" is used broadly to define components fully described in the above-mentioned Cizek patent. Merely by way of illustration, such resins will be homopolymers, such as polystyrene, polychlorostyrene and polyvinyl toluene, the modified polystyrenes such as rubber modified polystyrene blended or grafted high impact products, e.g., the rubber being a polybutadiene or a rubbery copolymer of from about 2 to about 30% styrene and from about 98 to about 70% of a diene monomer. Also included are styrene containing copolymers, such as styrene-acrylonitrile copolymers, styrene-butadiene copolymers, styrene-acrylonitrile-butadiene terpolymers, poly-alpha-methylstyrene, copolymers of ethyl vinyl benzene and divinyl benzene, and the like.

Especially preferred polyphenylene ethers are those of the above formula wherein Q and Q' are methyl and Q" are each hydrogen, i.e., poly(2,6-dimethyl-1,4-phenylene) ether. Especially preferred styrene resins are those wherein R is hydrogen and $p$ is 0. These will be homopolystyrene and a rubber modified polystyrene, e.g., one which contains a polybutadiene or rubbery styrene butadiene copolymer, and the like. These preferred normally flammable compositions are thoroughly described in Cizek, U.S. 3,383,435.

The normally flammable aromatic polycarbonates used in this invention are available commercially or can be prepared by known techniques. One general procedure comprises phosgenating a solution of a dihydric phenol in an inert solvent in the presence of an acid acceptor. For example, a solution of 2,2-(4,4'-dihydroxy-diphenyl)propane (Bisphenol A) is treated with phosgene in methylene chloride in the presence of pyridine to provide a particularly useful aromatic polycarbonate. Such procedures and techniques are thoroughly described in vol. 11, Encyclopedia of Polymer Science and Technology, above-mentioned, in the chaper entitled "Polycarbonates."

It is preferred that the polymer of a carbonate of a dihydric phenol be one of a family represented by the formula

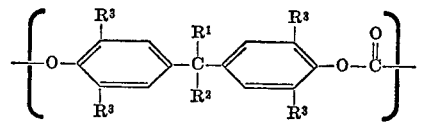

wherein $R^1$ and $R^2$ are hydrogen, (lower)alkyl or phenyl and the $R^3$ groups are selected from hydrogen or (lower)alkyl. It is preferred that the number of repeating units is sufficiently high to give a weight average molecular weight of above 10,000, and especially a number average molecular weight of from 15,000 to 50,000. Such polymers will process easily between about 425° F. and 480° F. and provide suitable mechanical properties.

Especially preferred aromatic polycarbonates will be those of the above formula wherein $R^1$ and $R^2$ are methyl and the $R^3$ groups are each hydrogen. This polymer is available commercially from a number of manufacturers.

The flame retardant ingredients used in combination in this invention are commercially available or can be made in known ways.

Hexabromobenzene is a solid, which melts at about 316° C. It is available commercially. Reference to procedures for the preparation of hexabromobenzene are given in Beilstein, 4th Edition, volume V, p. 215.

Antimony compounds useful in this invention are widely available or can be made in known ways. The type of antimony compound used is not critical, being a choice primarily based on economics. Both inorganic and organic antimony compounds can be used. For example, as organic compounds, there can be used: antimony oxide, $Sb_4O_6$; antimony chloride, $SbCl_3$; antimony phosphate; $KSb(OH)_6$; $NH_4SbF_6$; $SbS_3$; and the like. A wide variety of organic antimony compounds can also be used, such as antimony esters with organic esters, cyclic alkyl antimonites, aryl antimonic acids, and the like. Illustrative of the organic antimony compounds, including inorganic salts of such compounds are: KSb tartrate; Sb caproate; $Sb(OCH_2CH_3)_3$; $Sb(OCH(CH_3)CH_2CH_3)_3$; Sb polymethylene glycolate; triphenyl antimony; and the like. Especially preferred is antimony oxide.

The amount of the combination of hexabromobenzene and antimony compounds used in the compositions of this invention will be that which provides self-extinguishing properties and precludes dripping. As mentioned above, it is important that the bromine provided by the hexabromobenzene be kept below about 6.0 parts by weight per hundred parts by weight of said polymer. Since hexabromobenzene contains about 87% by weight of bromine, hexabromobenzene should not be used in excess of about 6.9 parts by weight per 100 parts of polymer. More than this will cause a decrease in mechanical properties, but most importantly, such compositions will drip after ignition. The lower limit of bromine content is not as critical, but below about 1.0 part of bromine per 100 parts of resin, self-extinguishing times increase. It is preferred to have hexabromobenzene present in an amount to provide from about 1.75 to about 5.25 parts by weight of bromine per hundred parts of said polymer. The antimony-containing compound can be used over fairly wide limits, provided however that the weight ratio of antimony to bromine be at least sufficient to preclude dripping. The antimony compound can be present in an amount to provide from about 1.0 to about 5.25 parts of antimony (calculated as metal) per 100 parts of polymer, but preferably the amount will provide from about 1.30 to about 3.50 parts by weight of antimony per 100 parts of polymer. The minimum weight ratio of antimony to bromine has been found to be critical to preclude dripping. If less than about 0.25 part of antimony are used for each 1.0 part of bromine in the combination, dripping is a problem. While there appears to be no upper limit on the ratio of antimony to bromine, it is preferred not to exceed 1.0:1.0. Thus the preferred weight ratio of antimony to bromine in the combination of hexabromobenzene and antimony compound is from about 0.25 to about 1.0:1.

A preferred feature of this invention is to include a small amount of an aromatic phosphate compound in the present compositions. Such an optional additive appears to render the entire mixture more homogeneous and facilitates dispersion of the flame retarding materials. In addition an aromatic phosphate compound appears to enhance flame resistance to an even higher level, due to a synergistic effect with the bromine compound. The organic phosphate alone at minor levels will not render mixtures of polyphenylene ether and polystyrene self-extinguishing. For example, it is necessary to use about 11 percent by weight of triphenyl-phosphate to render self-extinguishing a 30:70 (by weight) composition of poly(2,6-dimethyl-1,4-phenylene)ether and high impact polystyrene. Such composition have less than optimum physical properties. It has been found, however, that the self-extinguishing properties of the present compositions are markedly enhanced with only 0.5 to 2 parts of the aromatic phosphate per hundred parts of the resin. At such levels, physical properties are not impaired. It is noteworthy in this connection too, that the aromatic phosphorus compounds do not act synergistically with antimony, indicating an unexpected degree of cooperation between them and the polyphenylene ether resin component of the present compositions.

Preferred aromatic phosphate compounds are those of the formula

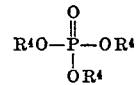

wherein at least one of the $R^4$ groups is monocarbocyclic aryl of up to 12 carbon atoms and the remaining $R^4$ groups are individually selected from hydrogen or hydrocarbon groups of from 1 to 12 carbon atoms.

Illustrative aromatic phosphates embraced by the above formula are phenyl bis dodecyl phosphate, phenyl bis neopentyl phosphate, phenyl ethylene hydrogen phosphate, phenyl-bis (3,5,5-trimethylhexyl phosphate), ethyl diphenyl phosphate, 2-ethylhexyl di(p-tolyl)phosphate, diphenyl hydrogen phosphate, bis(2-ethylhexyl)-p-tolyl phosphate, tritolyl phosphate, bis(2-ethylhexyl)phenyl phosphate, tri(nonylphenyl)phosphate, phenyl methyl hydrogen phosphate, di(dodecyl)p-tolyl phosphate, tricresyl phosphate, triphenyl phosphate, dibutylphenyl phosphate, 2-chloroethyl diphenyl phosphate, p-tolyl bis(2,5,5-trimethylhexyl)phosphate, 2-ethylhexyldiphenyl phosphate, and the like. The preferred phosphates are those wherein each $R^4$ is aryl. The most preferred phosphate is triphenyl phosphate.

It is also regarded to be among the features of this invention to include in the compositions, other ingredients, such as fillers, reinforcements, pigments, stabilizers, and the like, for their conventionally employed purposes.

For example, silica-type fillers, and fibrous glass reinforcements can be used in amounts of, e.g., about 2–30, preferably about 5, parts by weight per hundred parts of polymer. Moreover, small amounts of a polyolefin, e.g., polyethylene, 1–3 parts by weight per 100 parts of resin can be added to improve surface appearance.

The manner of adding the flame retardant combination to the polymer blend is not critical; is conventional and will be obvious to those skilled in the art. Preferably, however, each ingredient is added as a part of the blend premix, the latter being passed through an extruder with extrusion temperature being maintained between about 425° and 640° F., dependent on the needs of the particular composition. The strands emerging from the extruder may be cooled, chopped into pellets, re-extruded, chopped into pellets and molded to any desired shape.

DESCRIPTION OF THE PREFERRED EMBODIMENTS

The following examples illustrate the compositions of this invention. They are merely illustrative and are not to be construed to limit the invention in any manner whatsoever.

The tests for flame retardancy and non-dripping are carried out by the Underwriters' Laboratories Bulletin No. 94 procedure as follows: An injection molded test bar measuring 2½″ x ½″ by ⅛″ thick is twice ignited. After each 10 second ignition period, the test bar must extinguish itself within 30 seconds and the bar must not drip during the burning. If any one bar of three to five bars in each series burns for a period exceeding 30 seconds after either first or second ignition, or drips, the test is considered unsuccessful.

Izod impact strength is determined by standards set out in ASTM D-256. Other properties, heat distortion temperature, and tensile strengths are determined by ASTM standard methods.

EXAMPLE 1

Granular poly(2,6-dimethyl-1,4-phenylene)oxide, (General Electric Company, PPO), 20 parts by weight, rubber modified high impact polystyrene (Cosden Company, 825 TV), 80 parts by weight, and granular polyethylene (U.S. Industrial Chemicals Co., Microthene 710, P.E. 1.5 parts by weight), hexabromobenzene, 5 parts by weight and antimony oxide, 2 parts by weight and blended for 30 minutes before extrusion. The composition contains a weight ratio of PPO:825TV:PE:Br:Sb of 20:80:1.5:4.35:1.77. The Sb:Br ratio is about 0.4:1. The mixture is then passed through a hopper into the cylinder of a ¾″ Wayne single screw extrusion press. Extrusion is carried out at a temperature of between 450 and 465° F. After extrusion, the samples are pelletized and re-extruded under the same conditions. The extruded strands are chopped and the granules are injection molded at a temperature of 500° F. in a Newbury machine and a mold temperature of 200° F. into test bars measuring 2½″ x ½″ x ⅛″.

The U.L. Subject 94 flame test results are as follows: (sec. 1st)/(sec. 2nd), 4/2, 6/4, 4/1. There is no dripping.

Izod impact strength (Izod) is 0.68 fl. lbs./in. notch; heat distortion temperature (HDT) is 202° F.; tensile yield strength (TYS) is 8660 p.s.i., tensile strength (TSU) at break (ult.) is 8020 p.s.i., elongation at break (percent E), 8.7%.

For comparison purposes, the procedure of this example 1 is repeated, lowering the antimony oxide content from 2 to 1 part per 100 parts of resin. The weight ratio of PPO:825TV:PE:Br:Sb is 20:80:1.5:4.35:.885. The Sb:Br ratio is about 0.2:1.

The U.L. Subject 94 flame test results are as follows: (sec. 1st)/(sec. 2nd), 1/30 (drips), 0/20 (drips), 6/44 (drips).

Izod impact strength is 0.57 ft.lb./in. notch; heat distortion temperature is 196° F.; tensile (ult.) is 8740 p.s.i.; elongation is 5.3%.

It is demonstrated that an antimony:bromine ratio of 0.2:1 is insufficient to control dripping and also self-extinguishing requirements are not met with this amount of bromine, if the antimony level is below 1.30 parts per hundred of resin.

For purposes of further comparison, the procedure of this example is repeated, keeping the amount of antimony the same and doubling the amount of bromine from 5 parts to 10 parts per hundred of resin. The weight ratio of PPO:825 TV:PE:Br:Sb is 20:80:1.5:8.70:1.77. The Sb:Br ratio is 0.2:1.

The U.L. Subject 94 flame test results are as follows: (sec. 1st)/(sec. 2nd), 1/1 (drips), 2/1, 1/1, 1/20, (drips).

Izod impact strength is 0.84 ft.lb./in. notch; heat distortion temperature is 202° F.; tensile (ult.) is 6400 p.s.i.; elongation is 4.5%.

In this comparative example it is again demonstrated that an antimony:bromine ratio of 0.2:1 is insufficient to control dripping. In addition, although increasing the bromine content causes the self-extinguishing time requirements to be met, the tensile strength is seen to decrease.

For purposes of further comparison, the procedure of this example is repeated, omitting the antimony altogether. The weight ratio of PPO:825 TV:PE:Br:Sb is 20:80:1.5:4.35:0.

The U.L. Subject 94 flame test results are as follows: (sec. 1st)/(sec. 2nd), 55 (drips), 90 (drips), 60 (drips). Complete burning on second ignition in each case.

Izod impact strength is 1.20 ft.lb./in. notch; heat distortion temperature is 212° F.; tensile yield 8540 p.s.i.; tensile (ult.) 7320 p.s.i.; elongation, 12%.

The above results demonstrate that a combined level of Sb plus Br of 10.47 parts is not sufficient to control dripping when the Sb:Br ratio is only 0.2:1. Furthermore a combined level of Sb plus Br of 5.24 parts is not sufficient to control either self-extinguishing time or dripping if the Sb:Br ratio is only 0.2:1. However, a combined level of Sb plus Br of 6.12 parts is sufficient to control self-extinguishing time and preclude dripping if the Sb:Br ratio is 0.4:1.

For purposes of further comparison, the procedure of this example is repeated, omitting the polyphenylene ether and adjusting the other components as follows:

| Composition 1 | | Composition 2 | |
|---|---|---|---|
| Component | Parts | Component | Parts |
| High impact polystyrene (Monsanto HT-91) | 100 | High impact ABS (Marbon, Cycolac T) | 100 |
| Antimony oxide | 3 | Antimony oxide | 3 |
| Hexabromobenzene | 5 | Hexabromobenzene | 5 |

These compositions burned completely when tested in ⅛″ and 1/16″ sections under Bulletin UL 94.

Both compositions 1 and 2 represent butadiene-styrene materials which do not have any self-extinguishing characteristics with amounts of antimony and bromine shown to be satisfactory when only 20% of the resin is replaced by poly-(2,6-dimethyl-1,4-phenylene)ether.

In the following examples, it will be demonstrated that a combined level of Sb plus Br of only 4.39 is sufficient to control both dripping and self-extinguishing times if the Sb:Br ratio is 0.675:1.

EXAMPLES 2–6

The procedure of Example 1 is repeated, varying the amount of antimony oxide, and varying the amount of hexabromobenzene. The results are summarized in Table 1.

TABLE 1

[Flame retardant polyphenylene ether (PPO)—High impact polystyrene (825TV)—Polyethylene (PE)—Hexabromobenzene (HB)—Antimony oxide (AO) compositions]

| Example | Weight ratio, PPO:825TV:PE:Br:Sb | Wt./ratio, Sb:Br | U.L. No. 94 flame test (sec. 1st)/(sec. 2nd) |
|---|---|---|---|
| 2 | 20:80:1.5:4,35:1.77 | .4:1 | 4/4, 7/4, 3/4 |
| 3 | 20:80:1.5:4,35:2.66 | .6:1 | 1/15, 6/5, 25/3, 6/1 |
| 4 | 20:80:1.5:4,35:3.54 | .8:1 | 2/8, 2/5, 2/5 |
| 5 | 20:80:1.5:2,62:1.77 | .7:1 | 8/2, 25/5, 9/9, 6/2, 5/26 |
| 6 | 20:80:1.5:6,10:1.77 | .3:1 | 17/2, 10/1, 14/2 |

None of the above compositions according to this invention drip during burning. The Izod impact strengths are acceptable and range from 0.77 to 1.10. Heat distortion temperatures are acceptable and range from 206 to 208° F. Tensile yield strengths range from 7336 to 8400 p.s.i. Tensile ultimate strengths range from 7100 to 7900 p.s.i. Elongations at break range from 5.7 to 11.0%.

EXAMPLES 7–11

The procedure of Example 1 is repeated with the following additions and substitutions:

The antimony is increased from 1.77 to 2.66 parts by weight and 2 parts by weight of triphenylphosphate is added.

The polyphenylene ether content is increased from 20 to 50 parts, the styrene resin is decreased from 80 to 50 parts, the antimony content is increased from 1.77 to 2.66 parts and 1 part of triphenylphosphate is added.

The polyphenylene ether content is increased from 20 to 50 parts, the styrene resin is decreased from 80 to 50 parts, the bromine is decreased from 4.35 to 2.18 parts, the antimony is decreased from 1.77 to 1.33 parts.

The bromine is increased from 4.35 to 6.10 parts and 5 parts by weight of reinforcing glass (Johns Manville Company, Vitro Strand) is added.

The bromine content is increased from 4.10 to 6.10 parts and 5 parts by weight of silica filler (Cabot Corporation, Cabolite F-1) is added. The results are summarized in Table 2.

TABLE 2

[Properties of flame retardant polyphenylene ether (PPO)—High impact polystyrene (825TV)—Polyethylene (PE)—Hexabromobenzene (HB)—Antimony oxide (AO)—Triphenylphosphate (P)—Glass (G)—Silica (Si) compositions]

| Example | Weight ratio, PPO:825TV:PE:Br:Sb:P:G:Si | Wt. ratio, Sb:Br | U.L. No. 94 flame test (sec. 1st)/(sec. 2nd) |
|---------|------------------------------------------|------------------|----------------------------------------------|
| 7       | 20:80:1.5:4.35:2.66:0.2:0:0              | 0.6:1            | 1/9, 4/1, 3/2                                 |
| 8       | 50:50:1.5:4.35:2.66:1:0:0                | 0.6:1            | 4/2, 2/1, 1/2                                 |
| 9       | 50:50:1.5:2.18:1.33:1:0:0                | 0.6:1            | 2/14, 2/18, 4/4                               |
| 10      | 20:80:1.5:6.10:1.77:0:5:0                | 0.3:1            | 4/2, 27/1, 4/1, 1/1                           |
| 11      | 20:80:1.5:6.10:1.77:0:0:5                | 0.3:1            | 1/1, 1/1, 2/1, 1/1                            |

Flame retardant compositions according to this invention are made if the following substitutions are made in the formulation of Example 1.

For poly(2,6-dimethyl-1,4-phenylene)ether substitute poly(2,6-diethyl-1,4-phenylene)ether; poly(2-methyl - 6-ethyl-1,4-phenylene)ether; poly(2-methyl-6-propyl - 1,4-phenylene)ether; poly(2,6-dipropyl-1,4 - phenylene)ether and poly(2,6-diphenyl-1,4-phenylene)ether.

For high impact, rubber modified polystyrene, substitute crystal homopolystyrene; poly-alpha-methyl styrene; styrene-acrylonitrile copolymer (27% ACN units); styrene-acrylonitrile-butadiene terpolymer (16% ACN units; 43% BD units); and poly-alpha-chlorostyrene.

For antimony oxide, substitute stiochiometrical quantities of antimony chloride; triphenyl antimony and

$Sb(OCH_2CH_3)_3$

EXAMPLE 12

Granular aromatic polycarbonate, the condensation product of 2,2-(4,4'-dihydroxydiphenyl) propane and phosgene (U.S. 3,144,432, General Electric Company, LEXAN), 100 parts by weight, hexabromobenzene, 5 parts by weight, and antimony oxide, 3 parts by weight, are thoroughly blended, then extruded in a ¾″ Wayne single screw extruder at 450-475° F. The composition contains a weight ratio of polycarbonate:Br:Sb of 100:4.35:2.66. The Sb:Br ratio is about 0.6:1. After extrusion, the composition is pelletized, re-extruded, pelletized and injection molded into test bars 2½″ x ½″ x ⅛″.

The U.L. Subject 94 flame test results are as follows: (sec. 1st)/(sec. 2nd), 1/1, 1/1, 1/1. There is no dripping.

Izod impact strength (Izod) is 0.8 ft. lb./in. notch; heat distortion temperature (HDT) is 258° F.; tensile yield strength (TYS) is 9,666 p.s.i.; tensile strength (TSU) at break (ultimate) is 8,566 p.s.i., elongation at break (percent E) is 55%.

For comparison purposes, the procedure of this Example 12 is repeated, omitting the antimony oxide and hexabromobenzene and substituting a combination of 7 parts by weight of triphenylphosphate and 7 parts by weight of a highly chlorinated biphenyl (Arochlor 1268, Monsanto Co.). This combination has been proposed in the prior art as a flame retardant additive.

The U.L. Subject 94 flame test results are as follows: (sec. 1st)/(sec. 2nd), 0/0 (drips), 0/0 (drips), 0/0 (drips).

Izod impact strength is 0.7 ft. lb./in. notch; heat distortion temperature is 204° F.; TYS is 11,100 p.s.i.; TSU is 9,400 p.s.i., percent E is 59.

It is demonstrated that dripping is not controlled by this high level of halogen and phosphorus, and the heat distortion temperature is seriously and adversely affected.

For purposes of further comparison, the procedure of this Example 12 is repeated, omitting the antimony oxide and hexabromobenzene and substituting therefore 10 parts by weight of triphenylphosphate. This compound is widely used as a flame retardant in thermoplastics.

The U.L. Subject 94 flame test results are as follows: (sec. 1st)/(sec. 2nd), 0/0 (drips), 0/0 (drips), 0/0 (drips).

Izod impact strength is 0.7 ft. lb./in. notch; heat distortion temperature is 206° F.; TYS is 9,700 p.s.i., TSU is 7,333 p.s.i. and percent E is 30.

It is demonstrated that dripping is not controlled by this high level of phosphorus and the heat distortion temperature is seriously and adversely affected.

EXAMPLE 13

The procedure of Example 12 is repeated adding the following ingredients, respectively, to the composition:

1 part by weight of reinforcing fibrous glass (Vitro-Strand, Johns Manville Crop.) per 100 parts of aromatic polycarbonate; and 1 part by weight of finely divided silica (Cabolite, Cabot Corp.) per 100 parts of aromatic polycarbonate.

In each case the composition has good dimensional stability, especially during the second ignition period.

Flame retardant compositions according to this invention are made if the following substitutions are made in the formulation of Example 12:

For the polycarbonate from Bisphenol A, there are substituted polycarbonates derived from bisphenols of the following formulae:

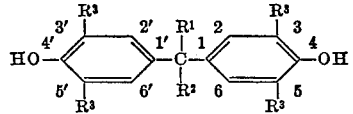

| R¹ | R² | R³ |
|----|----|----|
| H | H | 3-H,5-H,3'-H,5'-H |
| H | —CH₂CH₂CH₃ | 3-H,5-H,3'-H,5'-H |
| H | —CH(CH₃)₂ | 3-H,5-H,3'-H,5'-H |
| H | —C₆H₅ | 3-H,5-H,3'-H,5'-H |
| CH₃ | —CH₂CH₃ | 3-H,5-H,3'-H,5'-H |
| CH₃ | —CH₂CH₂CH₃ | 3-H,5-H,3'-H,5'-H |
| CH₃ | —C₆H₅ | 3-H,5-H,3'-H,5'-H |
| —CH₂CH₂CH₃ | —CH₂CH₂CH₃ | 3-H,5-H,3'-H,5'-H |
| —C₆H₅ | —C₆H₅ | 3-H,5-H,3'-H,5'-H |
| CH₃ | CH₃ | 3-H,5-CH₃,3'-H,5'-CH₃ |

For antimony oxide, substitute stiochiometrical amounts of antimony chloride; triphenyl antimony and

$Sb(OCH_2CH_3)$.

Although the above examples have shown various modifications of the present invention, other variations are possible in the light of the above teachings. It is therefore to be understood that changes may be made in the particular embodiments of the invention described which are within the full intended scope of the invention as defined by the appended claims.

What is claimed is:

1. A self-extinguishing and nondripping thermoplastic composition for molding comprising a normally flammable polymer composition comprising from about 10 to about 60 parts by weight of a polyphenylene ether resin and from about 90 to about 40 parts by weight of a polystyrene resin and flame retardant amount of a composition comprising a combination of
(a) hexabromobenzene and
(b) an inorganic or organic antimony-containing compound, tne amount of hexabromobenzene in said composition providing bromine not in excess of about 6.0 parts by weight per hundred parts of said polyphenylene ether resins, and the weight ratio of antimony to bromide is at least 0.25:1, said weight ratio being sufficient to prevent dripping of said composition during ignition and before self-extinguishment.

2. A composition as defined in claim 1 wherein said polyphenylene ether is of the formula

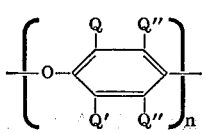

wherein Q is a hydrocarbon radical, a halohydrocarbon radical having at least two carbon atoms between the halogen atom and the phenol nucleus, a hydrocarbonoxy radical or a halohydrocarbonoxy radical having at least two carbon atoms between the halogen atom and the phenol nucleus; Q' is as defined for Q and, in addition, halogen, Q'' each are as defined for Q' and, in addition, hydrogen, provided that Q, Q' and Q'' are all free of a tertiary alpha-carbon atom; and $n$ is at least about 50; and said polystyrene resin has at least 25% by weight of the repeating units derived from a vinyl aromatic compound of the formula:

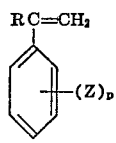

wherein R is hydrogen (lower)alkyl or halogen; Z is vinyl, halogen or (lower)alkyl; and $p$ is 0 or an integer from 1 to the number of replaceable hydrogen atoms on the benzene nucleus.

3. A composition as defined in claim 2 wherein, in said polyphenylene ether, Q and Q' are methyl and Q'' are each hydrogen, and in said styrene resin, R is hydrogen and $p$ is 0.

4. A composition as defined in claim 3 wherein said styrene resin is homopolystyrene.

5. A composition as defined in claim 3 wherein said styrene resin is a rubber modified high impact polystyrene.

6. A composition as defined in claim 1 wherein said hexabromobenzene is present in an amount to provide from about 1.75 to about 5.25 parts by weight of bromine per hundred parts of said polyphenylene ether resin, said antimony compound is present in an amount to provide from about 1.30 to 3.50 parts by weight of antimony per hundred parts by weight of said polymer and the weight ratio of antimony to bromine in said combination is 0.25—1:1.

References Cited
UNITED STATES PATENTS
3,383,435  5/1968  Cizek _____ 260—874
3,480,582  11/1969  Brooks _____ 260—45.75

J. ZIEGLER, Primary Examiner

U.S. Cl. X.R.
260—45.7 P, 45.75 R, 876

PO-1050
(5/69)

UNITED STATES PATENT OFFICE
CERTIFICATE OF CORRECTION

Patent No. 3,809,729            Dated May 7, 1974

Inventor(s) Donald L. Reinhard

It is certified that error appears in the above-identified patent and that said Letters Patent are hereby corrected as shown below:

| | |
|---|---|
| Claim 1, line 10 | "tne" should be --the-- |
| Claim 1, line 13 | "resins" should be --resin-- |
| Claim 1, line 13 | after "phenylene ether resins" insert --and said polystyrene resin-- |
| Claim 1, line 14 | "bromide" should be --bromine-- |
| Claim 1, line 14 | after "0.25:1" --in said combination-- was left out |
| Claim 6, line 4 | after "polyphenylene ether resin" insert --and said polystyrene resin-- |

Signed and Sealed this twenty-third Day of September 1975

[SEAL]

Attest:

RUTH C. MASON
Attesting Officer

C. MARSHALL DANN
Commissioner of Patents and Trademarks